(12) United States Patent
Evangelisti et al.

(10) Patent No.: US 12,222,048 B2
(45) Date of Patent: Feb. 11, 2025

(54) VALVE DEVICE

(71) Applicant: DE' LONGHI APPLIANCES S.R.L. CON UNICO SOCIO, Treviso (IT)

(72) Inventors: Paolo Evangelisti, Treviso (IT); Nicola Piovan, Treviso (IT); Davide Bonotto, Treviso (IT)

(73) Assignee: DE' LONGHI APPLIANCES S.R.L. CON UNICO SOCIO, Treviso (IT)

( * ) Notice: Subject to any disclaimer, the term of this patent is extended or adjusted under 35 U.S.C. 154(b) by 11 days.

(21) Appl. No.: 18/034,702

(22) PCT Filed: Oct. 26, 2021

(86) PCT No.: PCT/IT2021/050350
§ 371 (c)(1),
(2) Date: Apr. 29, 2023

(87) PCT Pub. No.: WO2022/091156
PCT Pub. Date: May 5, 2022

(65) Prior Publication Data
US 2023/0392698 A1 Dec. 7, 2023

(30) Foreign Application Priority Data

Oct. 29, 2020 (IT) .................. 102020000025669

(51) Int. Cl.
*F16K 7/06* (2006.01)
*A47J 31/46* (2006.01)
(52) U.S. Cl.
CPC ............. *F16K 7/066* (2013.01); *A47J 31/461* (2018.08)
(58) Field of Classification Search
CPC ........ A47J 31/461; F16K 7/066; F16K 7/068; F16K 7/045

USPC .......................................................... 251/4, 7
See application file for complete search history.

(56) References Cited

U.S. PATENT DOCUMENTS

| | | | | |
|---|---|---|---|---|
| 48,421 A | * | 6/1865 | Matthews, Jr. ........... | F16K 7/06 251/7 |
| 3,262,670 A | | 7/1966 | Marlett | |
| 4,634,092 A | * | 1/1987 | Daniell ................. | A61M 39/28 251/7 |
| 5,139,018 A | * | 8/1992 | Brodsky ............. | A61M 1/7415 128/207.14 |
| 5,285,718 A | * | 2/1994 | Webster ................ | G07F 13/065 99/290 |

(Continued)

FOREIGN PATENT DOCUMENTS

| | | |
|---|---|---|
| EP | 1 374 748 A2 | 1/2004 |
| WO | WO-95/33151 A1 | 12/1995 |
| WO | WO-2018/091485 A1 | 5/2018 |

OTHER PUBLICATIONS

International Search Report and Written Opinion for PCT/IT2021/050350, mailed Feb. 7, 2022.

*Primary Examiner* — Jessica Cahill (57) ABSTRACT

A valve device suitable to selectively obstruct a flexible tube, includes a first body and a second body operatively associated with each other, which are mobile with respect to each other along a sliding axis, thus configuring an open operating position and a closed operating position and thus defining a passage gap configured to be passed through by the flexible tube. The invention also concerns a machine for preparing beverages which includes a valve device and a corresponding functioning method.

14 Claims, 3 Drawing Sheets

(56) References Cited

U.S. PATENT DOCUMENTS

| | | | | |
|---|---|---|---|---|
| 6,536,738 | B2 * | 3/2003 | Inoue | F16K 7/06 251/5 |
| 6,883,773 | B1 * | 4/2005 | Mattheis | F16K 7/06 251/7 |
| 7,775,501 | B2 * | 8/2010 | Kees | F16K 7/065 251/5 |
| 8,387,943 | B1 * | 3/2013 | Mattheis | F16K 7/06 251/7 |
| 2007/0125810 | A1 * | 6/2007 | Blum | A45D 19/02 222/511 |
| 2014/0216557 | A1 * | 8/2014 | Klewinghaus | F16K 37/0091 137/553 |

* cited by examiner

VALVE DEVICE

FIELD OF THE INVENTION

Embodiments described here concern a valve device suitable to selectively obstruct a duct. The valve device can be used in particular as a self-priming valve for a pump or a solenoid valve. For example, the valve device can be associated with a vent connected to the delivery of a pump of a machine for preparing coffee.

BACKGROUND OF THE INVENTION

Applications are known, which provide to use pressure or vibration pumps to feed a determinate fluid, such as water, along a hydraulic circuit.

An example of such applications can be, for example, automatic machines for preparing beverages, to feed water from a tank to a brewing chamber.

In machines for preparing coffee beverages, the water is normally fed by means of a piston or vibration pump, which pushes the water toward a heating device in which it is heated before reaching a brewing chamber in which a dose of coffee powder is disposed.

In these machines, the water pressure is normally higher than 5 bar and, in the case of machines for preparing espresso coffee, the pressure pump can provide a pressure even greater than 15 bar, for example between 15 and 20 bar.

In these applications, problems are known in priming the pump, which can derive from the presence of pressurized air in the portion of the circuit connected to the pump delivery.

This air can accumulate for various reasons, for example following a period of inactivity of the machine, or due to the suction of air by the pump when the tank goes below a minimum level.

The air in the pump delivery can compromise its correct functioning, with consequent problems in preparing the coffee. When the tank empties, a difference in pressure can be generated, even a high one, in correspondence with the pump between an inlet having a pressure equal to atmospheric pressure and an outlet with a higher pressure, in practice making it impossible for the pump to function, which is no longer able to feed the water.

To overcome these problems it is therefore necessary to vent the delivery portion of the circuit of the pump.

Traditional solutions provide to insert a branch of the hydraulic circuit, for example associated with the delivery of the pump, along which valve devices are disposed, in order to allow, when necessary, the passage of a fluid through it.

In order to achieve this, some known solutions consist of complicated three-way valve devices that have a water inlet, a water outlet and a drain/vent outlet. These known solutions comprise a valve element which moves from a first position, in which it closes the drain/vent outlet and keeps the water outlet open, to a second position in which it closes the water outlet and keeps the drain/vent outlet open.

These solutions have substantial construction problems that make them particularly expensive, impacting the production cost of the final product in which they are included, and are not very reliable also due to the instability of the flow that they generate.

Furthermore, traditional systems have the disadvantage that they can cause a degradation in the performance of the pump, especially at the beginning of delivery or for low flow rates.

Document WO-A-95/33151 describes an electromagnetically driven "pinch" valve, which in the inactive condition is normally open. Due to the presence of the electromagnet, this valve is expensive and cumbersome, requiring an overall height much greater than the size of the tube to be obstructed, as well as a dedicated control system for the electromagnet itself. Document EP-A-1374748 describes a "pinch" valve provided with a mobile portion associated with a drive solenoid armature, which has a variable size between a closed position and an open position.

Document WO-A-2018/091485 discloses a "pinch" valve provided with a duct for the fluid with a deformable segment and a unit for pinching the duct provided with an engagement element that cooperates with a defined portion of the duct for the fluid, which has a smaller size than the average size of the duct itself.

Document U.S. Pat. No. 3,262,670 describes a "pinch" type valve in which the tube is disposed between two elements that slide with respect to each other.

There is therefore a need to perfect a valve device to selectively obstruct a duct which can overcome at least one of the disadvantages of the state of the art.

In particular, one purpose of the present invention is to provide a valve device which is simple and economical to produce.

Another purpose of the present invention is to provide a valve device which functions reliably.

Another purpose is to provide a valve device which can be selectively opened/closed in a simple, automatic way and as a function of the purpose of the hydraulic circuit in which it is installed.

Another purpose of the present invention is to provide a hydraulic circuit, for example for a machine for preparing coffee beverages, which has high reliability and functioning efficiency, even after a determinate period of inactivity.

Another purpose of the invention is to perfect a method for the functioning of a machine for preparing coffee beverages which prevents priming problems of the pump in any situation.

The Applicant has devised, tested and embodied the present invention to overcome the shortcomings of the state of the art and to obtain these and other purposes and advantages.

SUMMARY OF THE INVENTION

The present invention is set forth and characterized in the independent claims. The dependent claims describe other characteristics of the present invention or variants to the main inventive idea.

In accordance with the above purposes, a valve device is described suitable to selectively obstruct a duct, preferably defined by a flexible tube, which overcomes the limits of the state of the art and eliminates the defects present therein.

In particular, the valve device in question is a throttle or vice type valve, also referred to in the valve sector as a "pinch valve".

The flexible duct can be part of a hydraulic circuit, for example a circuit of a machine for preparing beverages.

The valve device in question can also be used in other household appliances, such as for example ironing apparatuses to feed water or steam from a boiler to an iron, or generally in applications where a high pressure difference can occur between an inlet and a delivery of a pump.

According to one aspect of the invention, the valve device comprises a first body and a second body operatively associated with each other.

The first body and the second body define, in cooperation with each other, a passage gap through which the flexible tube is disposed during use. The passage gap is preferably delimited on the entire perimeter by the first and second bodies.

In some embodiments, the first body and the second body are mobile with respect to each other along a sliding axis, thus configuring a closed operating position and an open operating position, and vice versa.

In the open operating position the passage gap has a section having a maximum transverse area, while in the closed operating position the passage gap has a section having a minimum transverse area.

The maximum transverse area is preferably such that the flexible tube disposed therein is not subjected to any interference or deformation by the first and/or by the second body, and its internal passage channel is completely open. When the passage gap has the minimum area, the first and second bodies interfere with the flexible tube, deforming it and squeezing it between them in such a way as to bring diametrically opposite portions of the flexible tube into contact with each other, so as to close the passage channel.

According to some embodiments, the passage gap lies in a plane parallel to the sliding axis and, during use, the flexible tube is disposed perpendicular with respect to the passage gap and to the sliding axis.

In some embodiments, the valve device comprises elastic means operatively associated with at least one of either the first or second body, and configured to retain the valve device in the closed operating position by elastic return.

The elastic means are preferably associated with the second body on one side thereof that is opposite the passage gap.

The valve mean comprises an actuation portion integral with the second body, and drivable in order to compress the elastic means and axially move the second body away from the first body so as to increase the section of the passage gap as above.

According to some embodiments, the second body comprises an interference element which in the closed operating position is disposed protruding in the passage gap and in the open operating position is positioned outside it.

In accordance with preferred embodiments, the actuation portion comprises a shaped portion configured to interfere, during use, with the movement of other components outside the valve device in order to transform their motion into a reciprocal sliding between the first body and the second body, along the sliding axis as above.

The present invention also concerns a hydraulic circuit comprising a main line along which there are connected, in sequence, a tank for water, a pump and a user device connected downstream of the pump, and a hydraulic branch that connects to the main line, downstream of the pump, along which a valve device according to the invention is provided.

The present invention also concerns a machine for preparing beverages, in particular coffee, comprising a tank for water, a brewing unit, a pump disposed along a hydraulic circuit that connects the tank and the brewing unit, and a valve device according to the present invention associated with a hydraulic branch located downstream of the pump.

In other embodiments, the machine for preparing beverages comprises a mobile brewing unit, which can be moved by motor means between at least a first and a second operating position. The valve device can be positioned along the trajectory of the path followed by the brewing unit, so that the latter can interfere with the actuation portion of the valve unit.

Advantageously, in this way, the movement of the brewing unit can cause the passage of the valve from the closed operating position to the open operating position.

The present invention also concerns a method for the functioning of a machine for preparing coffee.

The method can comprise, at power up, or at the start of a beverage preparation cycle, the priming of the pump in order to feed the water from the tank to the brewing unit and the verification of a correct priming of the pump.

Furthermore, the method can comprise a venting step which provides at least the opening of a valve device as described in the present invention in order to allow possible air bubbles present in the pump or along the hydraulic circuit to exit through a hydraulic branch located downstream of the pump.

In preferred embodiments of the method, the valve device can be taken into the open operating position by means of a contact between the mobile brewing unit, moved from a first work position to a second work position, and the actuation portion.

In particular, the method can provide to verify whether the pump has primed correctly and, in the event that the verification gives a negative result, the method provides to move the brewing unit into a position of activation in which it determines the drive of the actuation portion of the valve device, putting the delivery of the pump in communication with the atmospheric pressure, in such a way as to allow possible air bubbles to exit.

The position of activation can correspond to one of either the first or the second work position, for example corresponding to respective end-of-travel positions.

According to some embodiments, in order to drive the valve device, the method provides in particular to take the mobile brewing unit into a low end-of-travel position, defining the position of activation.

According to possible variants, as a function of the shape and disposition of the components of the machine, a different position of activation can be provided, for example in an intermediate position between the low end-of-travel position and a high end-of-travel position.

According to some embodiments, if during the delivery of the beverage the suction of the water from the tank is not detected, the method can provide the steps of:
requesting the filling of the tank;
receiving confirmation of the filling being complete;
reactivating the pump and, if the priming of the latter does not occur, returning the brewing unit to the position of activation.

BRIEF DESCRIPTION OF THE DRAWINGS

These and other aspects, characteristics and advantages of the present invention will become apparent from the following description of some embodiments, given as a non-restrictive example with reference to the attached drawings wherein.

To facilitate comprehension, the same reference numbers have been used, where possible, to identify identical common elements in the drawings. It is understood that elements and characteristics of one embodiment can conveniently be combined or incorporated into other embodiments without further clarifications.

DETAILED DESCRIPTION OF SOME EMBODIMENTS

We will now refer in detail to the possible embodiments of the invention, of which one or more examples are shown in the attached drawings, by way of a non-limiting illustration. The phraseology and terminology used here is also for the purposes of providing non-limiting examples.

Some embodiments described here with reference to the attached drawings concern a valve device 10 suitable to selectively obstruct a flexible tube 50.

The valve device 10 in question is, in particular, a throttle or shut-off type valve, also known as a "pinch valve", which is configured to keep a flexible tube 50 normally compressed, preventing the passage of a fluid inside it, and which is selectively drivable to allow the passage of the fluid.

According to some embodiments, the valve device 10 comprises at least a first body 11 and a second body 12 functionally associated with each other in such a way as to define between them a passage gap 15 in which the flexible tube 50 is positioned, during use.

The first body 11 and the second body 12 are slidingly coupled to each other in such a way as to allow a reciprocal sliding along a sliding axis X.

According to some embodiments, along the sliding axis X the valve device 10 has a substantially constant height H in each operating position.

According to some embodiments, at least one of either the first body 11 or the second body 12 can comprise guide means 14, configured to define the direction of the sliding.

Figure 7:
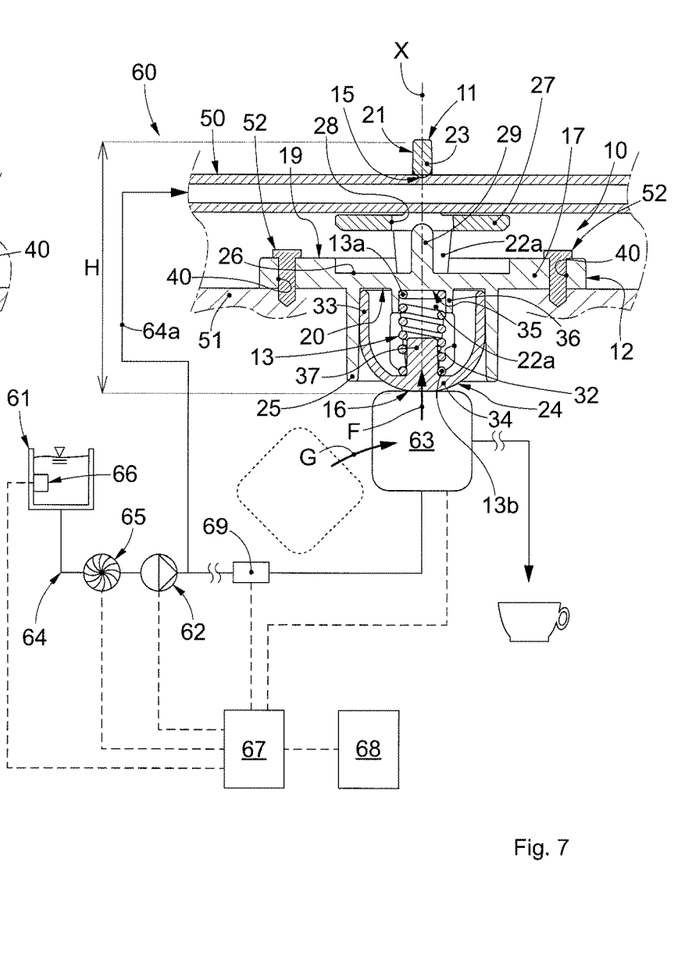

According to some embodiments, the passage gap 15 is comprised in a plane P parallel to the sliding axis X (FIG. 7).

Figure 1:
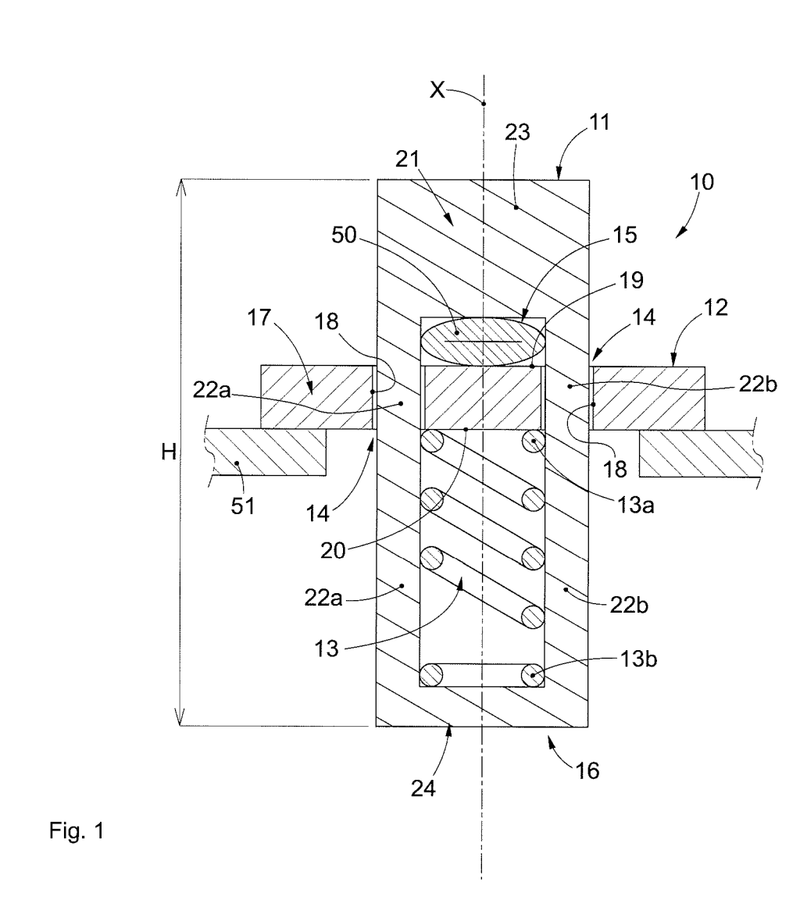
FIG. 1 is a schematic section view of a valve device according to some embodiments of the present invention in a closed operating position.
Figure 2:
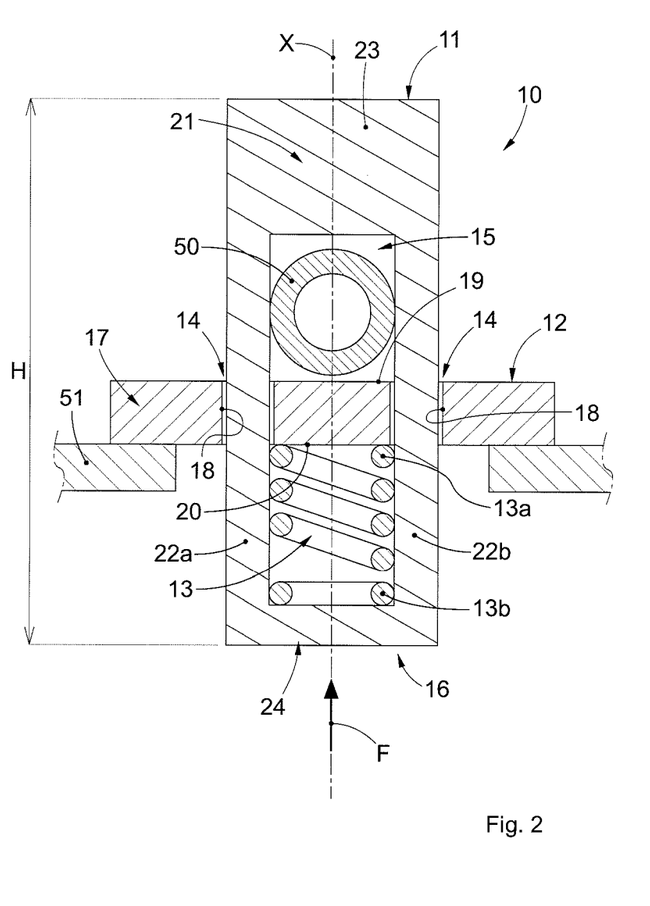
FIG. 2 is a schematic section view of the valve device of FIG. 1 in an open operating position.

The valve device 10 can assume a closed operating position (FIG. 1) and an open operating position (FIG. 2).

In the closed operating position, the passage gap 15 has a minimum transverse area. On the other hand, in the open operating position the passage gap 15 has a maximum transverse area.

During use, in the closed operating position the first 11 and the second 12 bodies interfere with the flexible tube 50, deforming it and at least partly obstructing the passage for a fluid, while in the open operating position they do not interfere with, or at least do not deform, the flexible tube 50, and therefore they do not even partly obstruct the passage for the fluid.

The valve 10 comprises elastic means 13 operatively associated with at least one of either the first body 11 or the second body 12, the elastic means 13 being configured to keep the valve device 10 in the closed operating position.

In accordance with some embodiments, the elastic means 13 are subjected to a stress greater in absolute value in the open operating position than in the closed operating position. In other words, the valve 10 is held in the closed operating position by elastic return.

According to some embodiments, at least one of either the first body 11 or the second body 12 is fixed, that is, it can be fixed to a support structure 51 by means of fastening means of a known type.

In this specific case, the second body 12 is fixed to a support structure 51, while the first body 11 is configured mobile with respect to the second body 12 along the sliding axis X.

The second body 12 can be provided with through holes 40 suitable to cooperate with fastening means 52 of a known type, such as pins, screws, or suchlike, to allow it to be fixed to the support structure 51.

The valve device 10 also comprises an actuation portion 16 drivable in order to axially move the first body 11 toward the open operating configuration, counteracting the action of the elastic means 13.

The actuation portion 16 is integral with the first body 11 and mobile together with it.

According to some embodiments, the actuation portion 16 is made integral with the first body 11, or fixed to it.

According to other embodiments, for example described with reference to FIGS. 3-7, the actuation portion 16 is connected and coupled to the first body 11 by means of coupling members 31, 32 of the removable type.

According to some embodiments, the elastic means 13 are disposed between the second body 12 and the actuation portion 16, and in the closed conformation of the valve device 10 they exert a thrust on the actuation portion 16, in such a way as to consequently pull the first body 11 toward the second body 12.

The actuation portion 16 can be configured to interfere, during use, with the movement of other components, which are outside the valve device 10.

The actuation portion 16 can be configured to transform the motion of other components along a determinate trajectory into a reciprocal sliding between the first body 11 and the second body 12 along the sliding axis X.

According to some embodiments, the actuation portion 16 can have a rounded and/or hemi-spherical shape in order to facilitate its drive by a mobile member.

Figure 3:
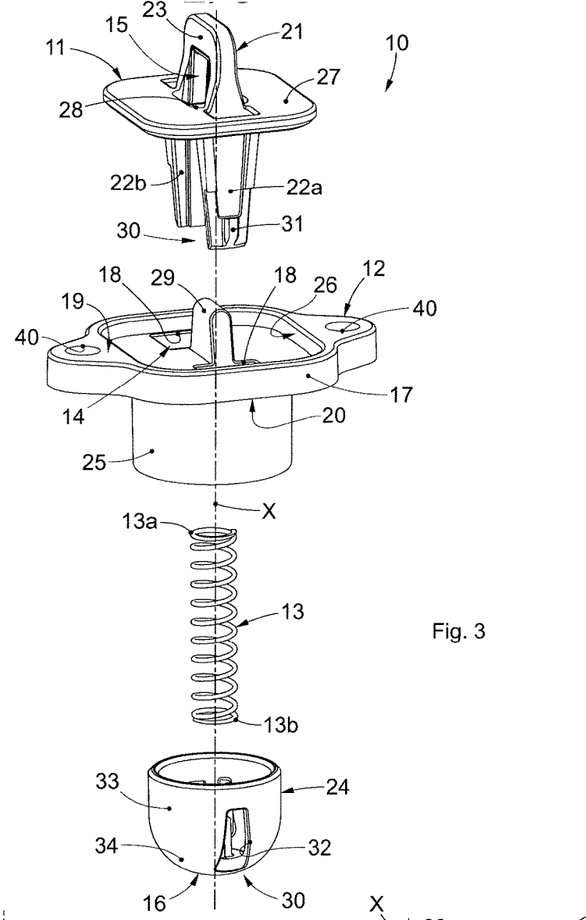
FIG. 3 is a three-dimensional exploded view of a different embodiment of a valve device according to the present invention.
Figure 4:
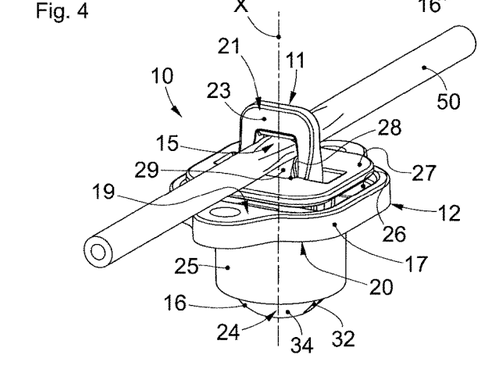
FIGS. 4 and 5 are three-dimensional representations of the embodiment of FIG. 3 in two different operating positions, respectively closed and open.
Figure 5:
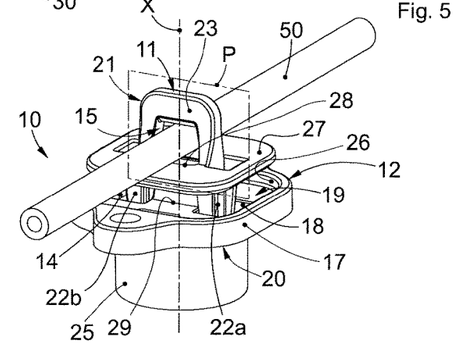

According to some embodiments, for example described with reference to FIGS. 3 to 5, the second body 12 comprises a flat portion 17 provided with through holes 18, which define part of the guide means 14.

The flat portion 17 comprises a first surface 19 which for a segment delimits the passage gap 15, and a second surface 20, opposite the first surface 19, which cooperates with the elastic means 13.

The first body 11 can have a U-shaped housing portion 21, which cooperates with the flat portion 17 to delimit the passage gap 15 perimetrically.

The passage gap 15 is therefore closed on the entire perimeter, being disposed as a ring around the flexible tube 50 when in use.

The housing portion 21 can comprise two longitudinal segments 22a, 22b, which extend parallel to the sliding axis X, and a transverse segment 23, which is orthogonal to the longitudinal segments 22a, 22b and joins them at the ends.

The longitudinal segments 22a, 22b are inserted in a sliding way in the through holes 18 and can have sections with a shape substantially mating therewith.

In this specific case, the sliding axis X is therefore substantially perpendicular to the second body 12 and parallel to the longitudinal development of the first body 11.

The passage gap 15 is delimited by the transverse segment 23, by the two longitudinal segments 22a, 22b and by the first surface 19 of the second body 12.

According to some embodiments, the valve device 10 comprises a closing element 24, integrated with or connected to the first body 11, and in particular to the ends of the longitudinal segments 22a, 22b which are opposite the transverse segment 23.

The closing element 24 acts as an abutment element for the elastic means 13.

The actuation portion 16 is connected to, or integrated with, the closing element 24, for example the actuation portion 16 is defined by an external portion of the latter.

In this way, when the valve device 10 is not subjected to any stress, the elastic means 13 thrust the closing element 24 away from the second body 12, consequently moving the transverse segment 23 toward the first surface 19 in order to reduce the section of the passage gap 15 and obstruct the flexible tube 50 therein.

On the other hand, when a force F is exerted on the actuation portion 16 toward the second body 12, in the sense indicated by the arrow in FIG. 2, the closing element 24 compresses the elastic means 13 while the transverse segment 23 is moved away from the first surface 19, widening the passage gap 15.

According to some embodiments, the valve device 10 consists of three elements: the first body 11, the second body 12 and a spring defining the elastic means 13.

According to other embodiments, the valve device 10 consists of four elements: the first body 11, the second body 12, a spring defining the elastic means 13 and the closing element 24 integrally connectable to the first body 11.

According to some embodiments, for example described with reference to FIGS. 3-5, the first body 11 comprises a flat striker portion 27 disposed transversely with respect to the longitudinal segments 22a, 22b and distanced from the transverse segment 23.

In particular, the striker portion 27 can be interposed between the transverse segment 23 and the distal ends of the longitudinal segments 22a, 22b. In these cases, the transverse segment 23, together with the striker portion 27 and, partly, the longitudinal segments 22a, 22b, defines the maximum transverse area of the passage gap 15.

The striker portion 27 can be advantageously configured to support the flexible tube which passes through the passage gap 15.

The striker portion 27 is configured to be positioned, in the closed operating position, in contact with the upper surface 19 of the second body 12 and limit the travel of the first body 11.

According to some embodiments, the second body 12 comprises an interference element 29 which in the closed operating position is disposed protruding inside the passage gap and in contact with the flexible tube 50, and in the open operating position is positioned outside the passage gap 15. The element 29 protruding from the first surface 19, configured to cooperate with the transverse segment 23 in order to deform the flexible tube 50 positioned in the passage gap 15, in such a way as to exert a compression on opposite sides of the flexible tube 50. This allows to obtain an optimal obstruction of the flexible tube 50, on the one hand requiring a lower force, since the force acts on a greater surface of the flexible tube 50, and on the other hand also entailing less stress and wear of the flexible tube 50 itself.

The interference element 29 can be disposed transversely between two opposite through holes 18, parallel to the transverse segment 23.

Advantageously, in this way, during use and in the closed operating position of the valve 10, the flexible tube 50 is obstructed, that is, compressed between the interference element 29 and the transverse segment 23.

According to some embodiments, the transverse segment 23 and the interference element 29 have a rectilinear development with a reduced width, of the order of 1-3 mm, in such a way as to exert a concentrated and punctual force from opposite sides of the flexible tube 50.

According to these embodiments, it can be provided that the striker portion 27 has a through hole 28 suitable to allow the passage of the interference element 29 therein.

According to other embodiments, the first surface 19 has a central seating 26 suitable to at least partly house the striker portion 27.

The central seating 26 can be configured as a recess having a shape in plan mating with that of the support element 27. In this specific case it is rectangular, however it can have a circular, oval or polygonal shape, or an irregular shape with curved and/or rectilinear segments.

According to some embodiments, the second body 12 also comprises a tubular portion 25, connected to the flat portion 17 and extending from the lower surface 20, which, during use, acts as a housing for the elastic means 13.

According to these embodiments, the first body 11 and the closing element 24 are provided with respective coupling means 30 suitable to define a stable reciprocal coupling between the two components.

Preferably, the coupling means 30 can be of the removable type and can define a coupling by interference, a same-shape coupling or a snap-in coupling.

The coupling means 30 can comprise attachment elements 31 provided on the longitudinal segments 22a, 22b of the first body 11, and respective attachment seatings 32 provided on the closing element 24, configured to receive and cooperate with the attachment elements 31.

The attachment elements 31 can for example be made as protruding teeth suitable to be inserted and attach in a respective attachment seating 32, for example in the form of a slot, provided on the closing element 24.

It is clear, however, that the attachment elements 31 can be provided on the closing element 24 and the attachment seatings 32 can be provided on the first body 11.

According to some embodiments, the closing element 24 can have a tubular portion 33, preferably cylindrical, closed at one end by a shaped portion 34.

The attachment seatings 32 can be made in an intermediate position between the tubular portion 33 and the shaped portion 34, so as to facilitate the insertion of the attachment elements 31 therein.

The tubular portion 33 is configured to be inserted inside the tubular portion 25 of the second body 12, which therefore defines the overall transverse size of the valve device 10.

In this way, once the first body 11 and the closing element 24 are coupled to each other, the coupling means 30 remain protected inside the tubular portion 25.

According to possible variants, the shaped portion 34 can be substantially hemi-spherical and is configured to act as an actuation portion 16.

Advantageously, this conformation allows to guide the sliding of the first body 11 with respect to the second body 12 more effectively.

In particular, the hemi-spherical conformation of the shaped portion 34 allows to position the valve device 10 along the path or the trajectory of a mobile mechanical element 63, in such a way that the valve device 10 is driven by the movement of the mechanical element 63.

In fact, if a body outside the valve 10 contacts the actuation portion 16, the hemi-spherical end is configured to transform the motion of the mechanical element 63 into a translation of the first body 11 along the sliding axis X (FIG. 7).

According to some embodiments, the elastic means 13 can be configured as a spring disposed between the second body 12 and the closing element 24. In particular, one end 13a of the spring 13 contacts the second surface 20 of the second body 12 and the other end 13b of the spring contacts an internal surface of the shaped portion 34.

In some embodiments, the elastic means 13 can be advantageously aligned with the sliding axis X.

The second surface 20 of the second body 12 can comprise a positioning seating 35, facing toward the closing element 24 that is connected, during use, to the first body 11, the positioning seating 35 being configured to receive one end 13a of the spring 13. In particular, the positioning seating 35 can comprise a perimeter edge 36, preferably circular, protruding from the second surface 20 of the second body 12.

According to some embodiments, the closing element 24 can comprise a protuberance 37 opposite the positioning seating 35 (FIGS. 6 and 7) configured to be inserted into the spring 13, in correspondence with one end 13b thereof. Advantageously, in this way the spring 13 is correctly positioned in the valve device 10 and firmly anchored thereto.

The present invention also concerns a machine 60 for preparing beverages, in particular coffee, which comprises a tank 61 for water, a pump 62 and a mobile brewing unit 63 driven by motor means (not shown).

Figure 6:
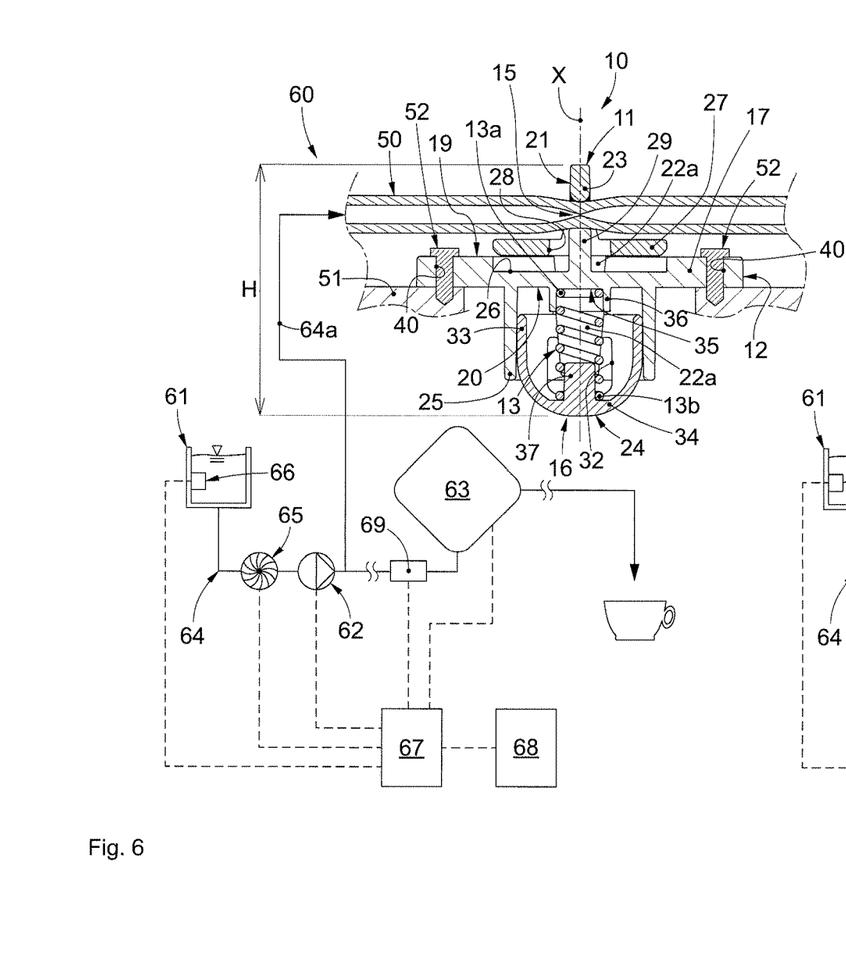
FIGS. 6 and 7 are schematic representations of a hydraulic circuit in which a valve device according to the invention, represented in section, is installed, respectively in the closed operating position and in the open operating position.

The machine 60 also comprises a hydraulic circuit 64 which fluidically connects the tank 61 with the pump 62 and the brewing unit 63 (FIGS. 6 and 7).

The brewing unit 63 comprises a brewing chamber inside which a dose of coffee powder is placed, the brewing chamber being fluidically connected to a beverage delivery nozzle.

However, it is not excluded that the hydraulic circuit 64 comprises other components disposed between the pump 62 and the brewing unit 63, downstream of the brewing unit and/or interposed between the tank 61 and the pump 62.

Along the hydraulic circuit 64 there can also be disposed a heating device 69 suitable to heat the water fed by the pump 62 upstream of the brewing unit 63.

In some embodiments, the machine 60 can also comprise flow rate detection means 65 configured to detect the flow of water generated by the pump 62, such as a flow meter, preferably disposed upstream of the pump 62.

In other embodiments, the machine 60 can comprise level detection means 66 configured to detect the amount of water present in the tank 61.

According to some embodiments, the hydraulic circuit 64 can comprise a branch 64a disposed downstream of the pump 62, that is, along the delivery duct, along which a valve device 10 according to the invention is disposed.

The branch 64a can comprise at least one segment of flexible tube 50 put in fluidic communication with the atmospheric pressure, for example fluidically connected to the external environment, which is disposed in the passage gap 15.

In some embodiments, the brewing unit 63 can be moved by the motor means at least from a first work position to a second work position.

By way of example, the brewing unit 63 can be moved between a first work position in correspondence with a first low end-of-travel position, and a second work position in correspondence with a second high end-of-travel position.

According to one aspect of the invention, the valve device 10 can be disposed in the machine 60 in such a way that the movement of the brewing unit 63 from the first to the second work position interferes with the actuation portion 16, in order to determine a compression of the elastic means 13 and a relative translation between the first body 11 and the second body 12 along the sliding axis X, in such a way as to widen the section of the passage gap 15 and allow the evacuation of possible air bubbles present in the delivery duct.

By way of example, it can be provided that at least one part of the brewing unit 63 moves along a curved trajectory, indicated by the arrow G in FIG. 7. The rounded conformation of the shaped portion 34 makes the conversion of the thrust received during the rotation into an axial sliding movement of the closing element 24 and of the first body 11 particularly effective.

Advantageously, this disposition allows to coordinate the opening of the valve unit 10 with the movement of the brewing unit 63, so as to always ensure a correct functioning of the pump 62.

According to preferred embodiments, the valve unit 10 is disposed in such a way as to be driven by the brewing unit 63 when the latter is in the low end-of-travel position, that is, in the rest position.

Since the brewing unit 63 returns to this position at the end of each beverage delivery cycle, this allows to automatically activate the valve device 10 each time it returns to this position.

The machine 60 can also comprise a control and management unit 67 configured to determine the start/stop of the pump 62 and the start/stop of the motor means. Furthermore, the control and management unit 67 can communicate with the flow rate detection means 65 and with the level detection means 66.

In preferred embodiments, the machine 60 also comprises user interaction means 68 commandable by the control and management unit 67 in order to transmit information to a user. For example, the interaction means 68 can comprise screens, keys, keypads, luminous devices (such as LEDs or suchlike) and acoustic devices. Furthermore, the interaction means 68 can be configured to receive information from a user and to transmit it to the control and management unit 67.

In some embodiments, the control and management unit 67 can be configured to transmit information to a user on the basis of the information received from the level detection means 66. For example, if the level in the tank 61 reaches or is lower than a minimum level, the control and management unit 67 can request, by means of the interaction means 68, that a user fills the tank 61.

In some embodiments, a user can confirm the filling is complete by means of the user interaction means 68.

The control and management unit 67 can also be configured to determine the start of the motor means on the basis of the information received from the flow rate detection means 65. For example, if the flow detected by the flow rate detection means 65 is smaller than a minimum value, the control and management unit 67 can start the motor means causing a movement of the brewing unit 63.

Some embodiments described here also concern a method for the functioning of a machine 60 for preparing beverages.

The method according to the invention comprises, at power up or when a beverage preparation cycle is started, the priming of the pump 62 in order to feed the water from the tank 61 to the brewing unit 63 and the verification of a correct priming of the pump 62.

Furthermore, the method comprises a venting step which provides at least the opening of a valve device 10 according to the present invention to allow possible air bubbles present in the pump 62 or along the hydraulic circuit 64 downstream thereof to exit through a branch 64a located downstream of the pump 62.

In preferred embodiments of the method, the valve device 10 can be taken into the open operating position by means of a contact between the mobile brewing unit 63, moved from a first work position to a second work position, and the actuation portion 16.

In particular, the method can provide to verify whether the pump 62 has primed correctly and, if the result of the verification is negative, the method provides to move the brewing unit 63 into a position of activation in which it determines the drive of the actuation portion 16 of the valve device 10, putting the delivery of the pump 62 in communication with the atmospheric pressure, in such a way as to allow possible air bubbles to exit.

The position of activation can correspond to one of either the first or the second work position, which in turn can correspond to respective end-of-travel positions.

According to some embodiments, in order to drive the valve device 10, the method provides in particular to take the brewing unit 63 into a lower end-of-travel position.

According to possible variants, as a function of the shape and disposition of the components of the machine 60, a different position of activation can be provided, for example in an intermediate position between the low end-of-travel position and a high end-of-travel position.

According to some embodiments, if during the delivery of the beverage the suction of the water from the tank 61 is not detected, the method can provide the steps of:
  requesting the filling of the tank 61, for example by displaying a message for the user by means of the interaction means 68, or by generating an alarm, for example of a luminous and/or sound type;
  receiving confirmation of the filling being complete, for example by means of the interaction means 68 or the level detection means 66;
  reactivating the pump 62 and, if the priming thereof does not occur, returning the brewing unit 63 to the position of activation.

According to some embodiments, the method can also comprise:
  a step of verifying the level of the tank 61;
  a step of filling the tank 61;
  a step of starting the pump 62;
  a step of verifying the flow, that is, the priming of the pump 62.

If the level of the liquid is lower than or equal to a minimum level, the step of verifying the level can be followed by the generation of an alarm which requests that a user fills the tank 61.

The step of verifying the flow, that is, that the pump 62 is correctly primed, can be carried out on the basis of the data supplied by the flow meter 65 or the level detection means 66.

According to preferred embodiments, the step of verifying the flow occurs in parallel to the step of starting the pump 62.

In the event that the flow rate determined in the step of verifying the flow is lower than or equal to a minimum value, the method can provide to execute a venting step.

According to some embodiments, the venting step can provide to move the brewing unit 63 into the position of activation of the actuation portion 16, for example in correspondence with the low end-of-travel position.

In this way, the valve device 10 is opened, putting the delivery of the pump 62 in communication with the atmospheric pressure.

The method then provides to activate the pump 62 again and, in the event that the priming is successful, to proceed with the beverage preparation and delivery cycle.

According to some embodiments, the method can provide to execute a venting step each time the brewing unit 63 is positioned in correspondence with the position of activation.

It is clear that modifications and/or additions of parts or steps may be made to the valve device 10, to the machine 60 for preparing beverages and to the corresponding functioning method as described heretofore, without departing from the field and scope of the present invention as defined by the claims.

In the following claims, the sole purpose of the references in brackets is to facilitate reading: they must not be considered as restrictive factors with regard to the field of protection claimed in the specific claims.

The invention claimed is:

1. A valve device of the normally closed type, suitable to selectively obstruct a flexible tube and comprising a first body and a second body operatively associated with each other, wherein said first and second bodies define a passage gap between them delimited on the entire perimeter and configured to be passed through by said flexible tube, and are mobile with respect to each other along a sliding axis, thus configuring an open operating position and a closed operating position, wherein said valve device comprises elastic means operatively associated with at least one of either said first or second body, said elastic means being configured to maintain said valve device in said closed operating position, and an actuation portion, integral with the first body, drivable to axially move said first body toward said open operating position, wherein said second body comprises an interference element which in said closed operating position is disposed protruding in said passage gap and in said open operating position is positioned outside said passage gap, and wherein said second body has a flat portion provided with through holes in which there are inserted longitudinal segments present in said first body, said first body in turn including a U-shaped housing portion having a transverse segment delimiting said passage gap.

2. The valve device as in claim 1, comprising a closing element integral with said first body and disposed on the opposite side of said second body with respect to said passage gap, wherein said elastic means are disposed between said second body and said closing element.

3. The valve device as in claim 1, wherein said interference element protrudes from a first surface of said flat portion and is configured to cooperate, in the closed operating configuration, with said transverse segment in such a way as to exert a compression on opposite sides of the flexible tube.

4. The valve device as in claim 1, wherein said first body comprises a flat striker portion disposed transversely with respect to said longitudinal segments, said striker portion being distanced from said transverse portion.

5. The valve device as in claim 1, wherein said second body comprises a tubular portion connected to said flat portion on the side opposite said passage gap, defining a housing for said elastic means.

6. The valve device as in claim 1, wherein said actuation portion has a rounded shape.

7. The valve device as in claim 1, wherein said first body includes a closing element integrated with or connected to the first body, and wherein a spring defines the elastic means and said closing element.

8. The valve device as in claim 1, wherein along said sliding axis the valve device has a substantially constant height in each operating position.

9. The valve device as in claim 1, wherein said actuation portion has a rounded and/or hemi-spherical shape.

10. A machine for preparing beverages, comprising: a tank, a pump and a mobile brewing unit, all fluidically connected by a hydraulic circuit, and further comprising the valve device as in claim 1, the valve device disposed along a hydraulic branch located downstream of said pump.

11. The machine for preparing beverages as in claim 10, wherein said valve device is disposed in said machine along a trajectory traveled by said brewing unit between a first and a second work position in such a way that said brewing unit, or a part thereof, during the movement from the first to the second operating position, or vice versa, mechanically interferes with said actuation portion automatically taking said valve device into the open operating configuration.

12. A method of operating a machine for preparing beverages, comprising:
providing the machine comprising a tank, a pump and a mobile brewing unit, all fluidically connected by a hydraulic circuit:
providing a valve device disposed along a hydraulic branch located downstream of said pump, the valve device being of a normally closed type and suitable to selectively obstruct a flexible tube, the valve device comprising a first body and a second body operatively associated with each other, wherein said first and second bodies define a passage gap between them delimited on the entire perimeter and configured to be passed through by said flexible tube, and are mobile with respect to each other along a sliding axis, thus configuring an open operating position and a closed operating position, wherein said valve device comprises elastic means operatively associated with at least one of either said first or second body, said elastic means being configured to maintain said valve device in said closed operating position, and an actuation portion, integral with the first body, drivable to axially move said first body toward said open operating position, wherein said second body comprises an interference element which in said closed operating position is disposed protruding in said passage gap and in said open operating position is positioned outside said passage gap; and
when the machine is powered on, or at the start of a beverage preparation cycle:
priming of the pump to feed the water from the tank to the brewing unit;
verifying a correct priming of said pump, and
performing a venting step that drives the valve device in order to take said valve device into the open operating position and allow possible air bubbles present in said pump or along the hydraulic circuit to exit through said hydraulic branch located downstream of the pump.

13. A method as in claim 12, automatically driving said valve device during the movement of said brewing unit when the latter is in a position of activation.

14. A method as in claim 13, wherein, in the event that during the beverage preparation cycle the suction of the water from the tank following the priming of the pump is not detected, the method further comprises:
requesting a filling of the tank, by displaying a message for a user or generating an alarm;
receiving confirmation of the filling being complete; and
reactivating the pump and, if the priming of the pump does not occur, return the brewing unit to the position of activation.

\* \* \* \* \*